4 Sheets Sheet 1

J. Urmy,

Mower.

No. 3412.

Reissued Apr 1. 27. 1869

4 Sheets. Sheet 2
J. Urmy.
Mower.
No. 3412
Reissued Apl. 27. 1869
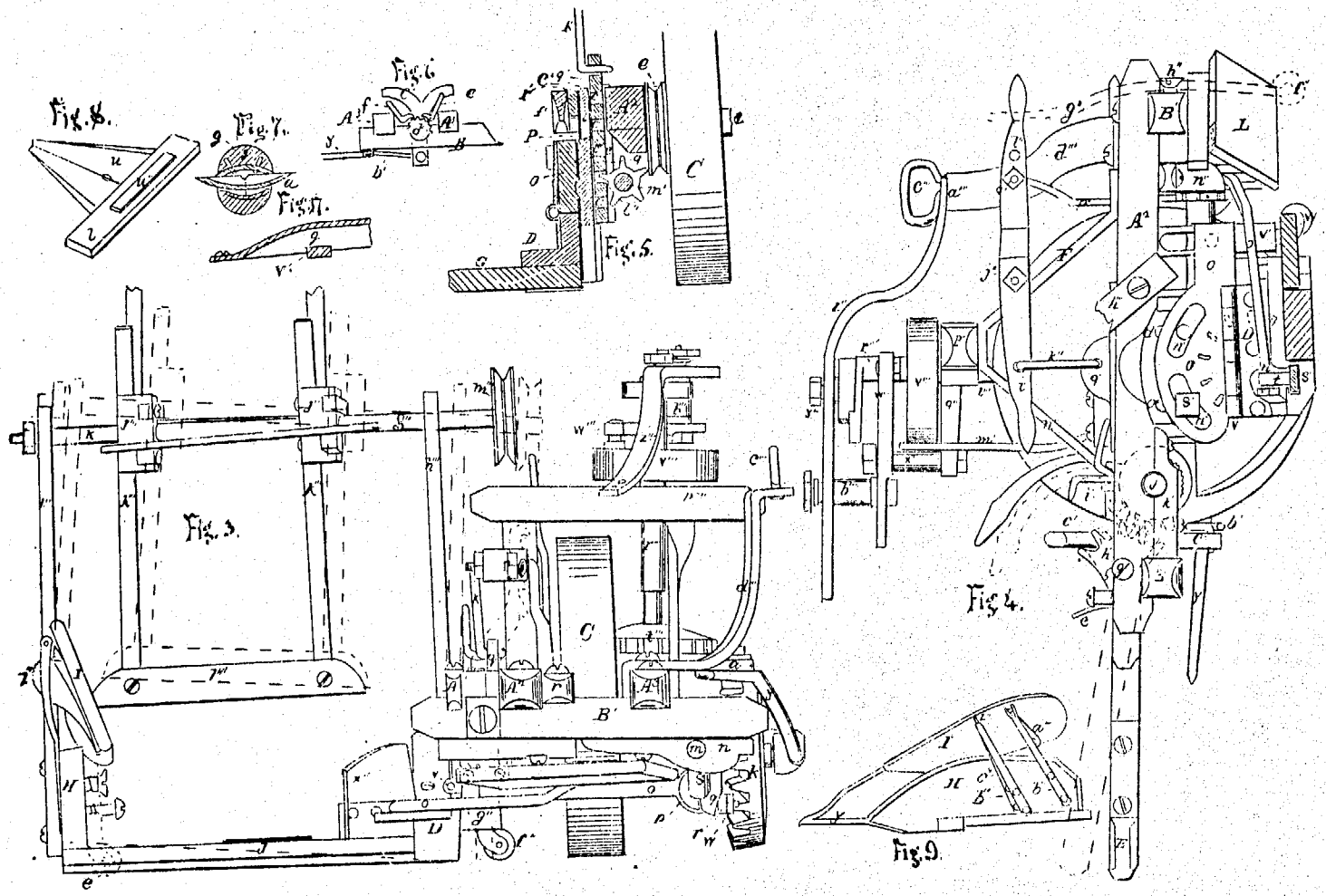

J. Urmy,
Mower.
4 Sheets. Sheet. 3.
No. 3412.
Reissued Apl. 27 1869
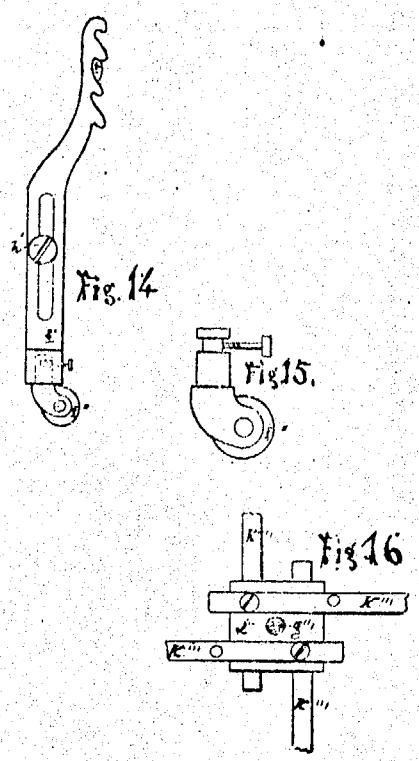
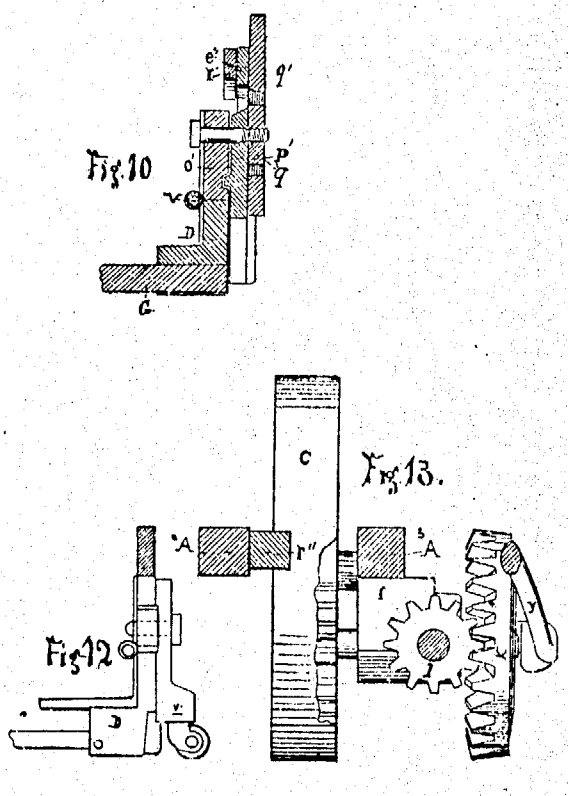
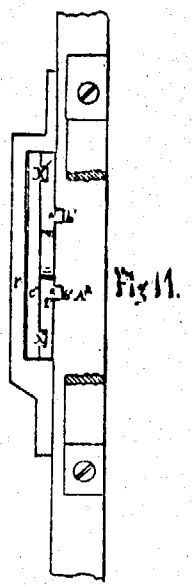

4 Sheets: Sheet 4
J. Urmy,
Mower.
No. 3412. Reissued. Apr. 27, 1869.
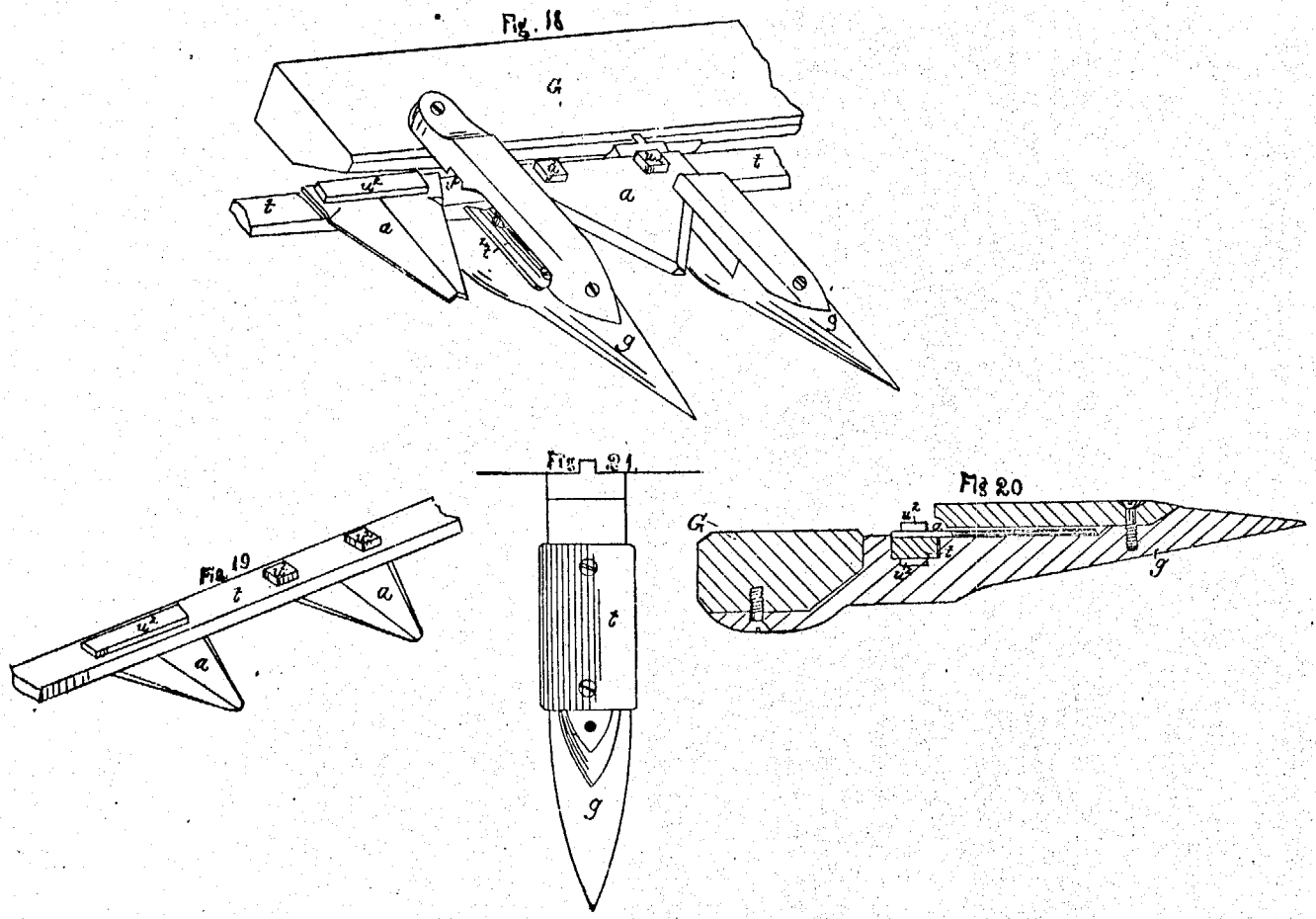

United States Patent Office.

DANIEL URMY AND JOHN MANZ, OF WILMINGTON, DELAWARE. ASSIGNEES OF JESSE URMY

*Letters Patent No.* 13,330, *dated July* 24, 1855; *reissue No.* 882, *dated January* 3, 1860; *reissue No.* 3,412, *dated April* 27, 1869.

DIVISION B.

IMPROVEMENT IN GRAIN AND GRASS-HARVESTERS.

The Schedule referred to in these Letters Patent and making part of the same

*To all whom it may concern:*

Be it known that JESSE URMY, of Wilmington, in the county of New Castle, and State of Delaware, invented new and useful Improvements in Harvesters; and we do hereby declare the following to be a full, clear, and exact description of the same, reference being had to the accompanying drawings, in which—

Figure 3 is a rear elevation of the machine.

Figure 4 is an elevation of the inner side of same.

Figure 5 is a vertical section through the shoe and coupling-plates, on the line *x–x*, *fig.* 4.

Figure 6 is a front elevation of the three-armed lever, by which the cutters are thrown in or out of gear, and the latches, by means of which said lever is retained in the desired position.

Figure 7 represents a vertical transverse section of one of the cutters and its guard-finger.

Figure 8 is a perspective view of one of the cutters.

Figure 9 is an elevation of the outer side of the divider, at the outer end of the cutting-apparatus.

Figure 10 is a vertical section through the shoe and coupling-plates, on the line *z–z*, fig. 4.

Figure 11 is a plan of the inner side-rail $A^2$ of the main frame, showing the guiding-feathers and grooves, and the retaining-strap $r^1$.

Figure 12 is an elevation of the rear end of the shoe, showing the attachment of its caster-wheel.

Figure 13 is an elevation of the rear of the main driving-wheel, showing the position of the box *f*, which supports the shaft of its pinion.

Figure 14 is an elevation of the adjustable caster-wheel and its frame, at the rear of the main frame.

Figure 15 is an elevation of the caster-wheel, detached.

Figure 16 is an elevation of the head-block of the reel, showing the method of adjusting the reel-arms.

Figure 17 is a vertical longitudinal section of one of the guard-fingers.

Figure 18 is a perspective view of two fingers, cutters, &c.

Figure 19 is a perspective view of two cutters and cutter-bar.

Figure 20 is a longitudinal section of the open finger.

Figure 21 is a plan view of the closed finger, with the upper portion removed, for showing the manner of connecting these parts, and the screws that hold the bed-plates in place.

Figure 2:
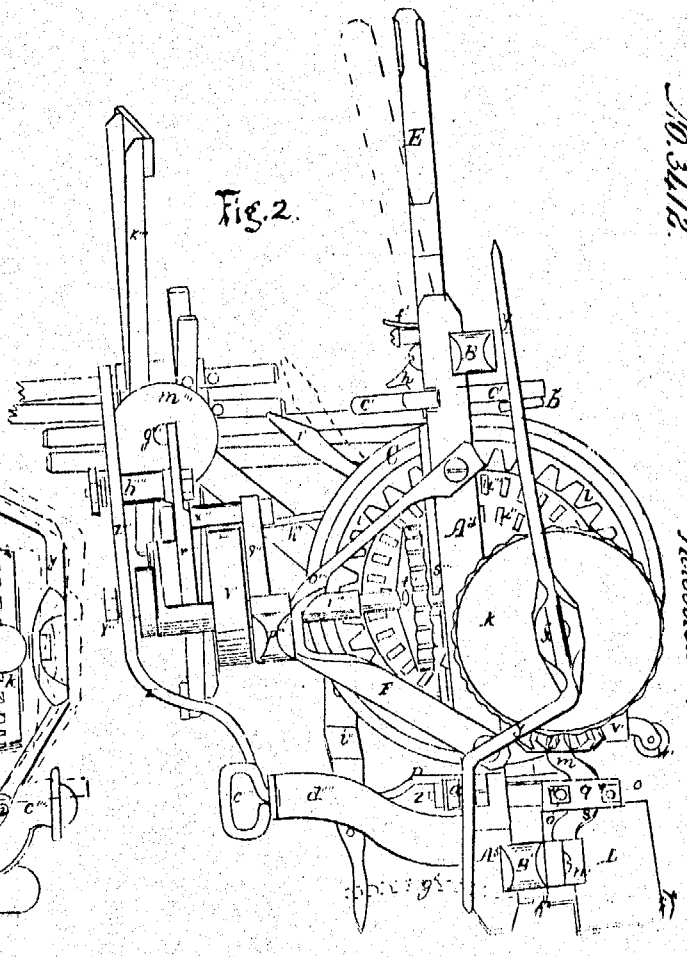
Figure 2 is an elevation of the outer side of the machine.

That side of the machine which is at the right, when standing behind and facing it, we call the inner side, and that at the left, the outer side; and that end, side, or edge of any of the parts which is at the right, we call the inner, and that at the left, the outer one.

That part of the aforesaid invention included in this patent, will be understood by the following description explanations, and claims.

The main frame of the machine is formed of the beams $A^1$, $A^2$, and $A^3$, and the cross-beams B and $B^1$ under them, each let into the other a short distance where they cross, and held together by screws, so that the crossing-parts may always be held firmly together by tightening the screws, and for convenience in the specification, this frame is designated by the letter A, and, whenever so referred to, it is to be understood as including the parts above named.

C is one of the supporting-wheels of the frame A, and the driver of the cutters *a a*, the reel K, and the automatic rake *c*, and the outer end of its axle, *d*, to which is secured the driving-pulley *e* of the reel K, is held to the lower side of the beam $A^2$ by a suitable box, and the inner end is held to the lower side of the beam $A^3$ by the box *f*, shown in fig. 13, in connection with this beam.

The cutters *a a* receive their reciprocating motion across the shoe D, the fingers *g g*, and the divider H, and through their horizontal slots, through the medium of the following device, viz, the internal gear *i* on the inner side, or face of this wheel C, near its outer periphery; the pinion that gears therewith, secured on the outer end of the pinion-shaft *j*, sustained in the lower part of the box *f*; the bevel-driver *k*, on the inner end of shaft *j*; the pinion *l*, on the horizontal crank-shaft *m*, whose front end, as well as the shaft *j*, is sustained in the lower part of the box *f*, while the rear end is sustained in the lower part of the box *n*, secured to the lower side of the beam $B^1$; the pitman *o*, including the boxes *p* and *q* and the screw-nuts *r r*, by which it is confined to the crank, or wrist *s* formed in shaft *m*; and the cutter-bar *t*, to which these cutters *a a* are rigidly secured, and through the heel of which bar the outer end of this pitman *o* passes horizontally, so as to form an axis, *u*, upon which the pitman and cutter-bar move in relation to each other.

The pitman *o*, by having its driving-crank shaft *m* thus located in respect to the main frame A and the axle of the cutter's driving-wheel C, the axis of motion between this pitman and its driving-crank, and the axis *u* between its outer end and the cutter-bar *t*, both about horizontal, as the axial bolt *v* between the shoe D, hereafter described, (which sustains the cutter-bar,) and main frame A is, contains three peculiar features or elements:

First, it is more nearly in the same horizontal position with the cutter-bar than it could be were the driving-crank shaft $m$ as high only as the lower sides of the beams $A^2$ and $A^3$, and thereby the cutters are reciprocated with less power applied than they could be were this crank-shaft $m$ but as high as the lower sides of said beams.

Second, the fingers and cutters are so slightly varied in respect to each other, while the shoe D by which they are sustained is being raised and lowered in a plane about parallel with the plane of the cutter's driving-wheel, as to not injuriously affect their severance of the crop.

Third, the crank, or wrist $s$, and the axis $u$, are both about parallel with the axis $v$, between the shoe D, which sustains the cutter-bar $t$, and the frame A, to which this shoe is connected, so that neither the raising or lowering of the shoe D, in respect to the frame A, or the raising or lowering of the divider H, in respect to the shoe D and the crank-wrist $s$, will cause any serious cramping of any of the parts upon their axis of motion, as would be the case were either of these three axes about at right angles to one of the others, unless a fourth axis be used.

The screw-nuts $r$ $r$ are prevented from turning on the forks of the pitman by the jam-nuts $w$ $w$, forced on to those forks after the nuts $r$ $r$ are screwed up to the desired place; and the outer end of the pitman is prevented from getting out of connection with the cutter-bar by having the screw-nut $x$ thereon.

$y$ is the lever, by which the cutters $a$ $a$ are thrown in or out of motion. The outer central portion of this lever $y$ fits in a groove cut in the inner projecting end of the shaft $j$, and has the rear end pivoted at $z$, in one of a series of holes in the arm $a$, which is secured to the upper edge of $A^3$ by a screw.

Figure 1:
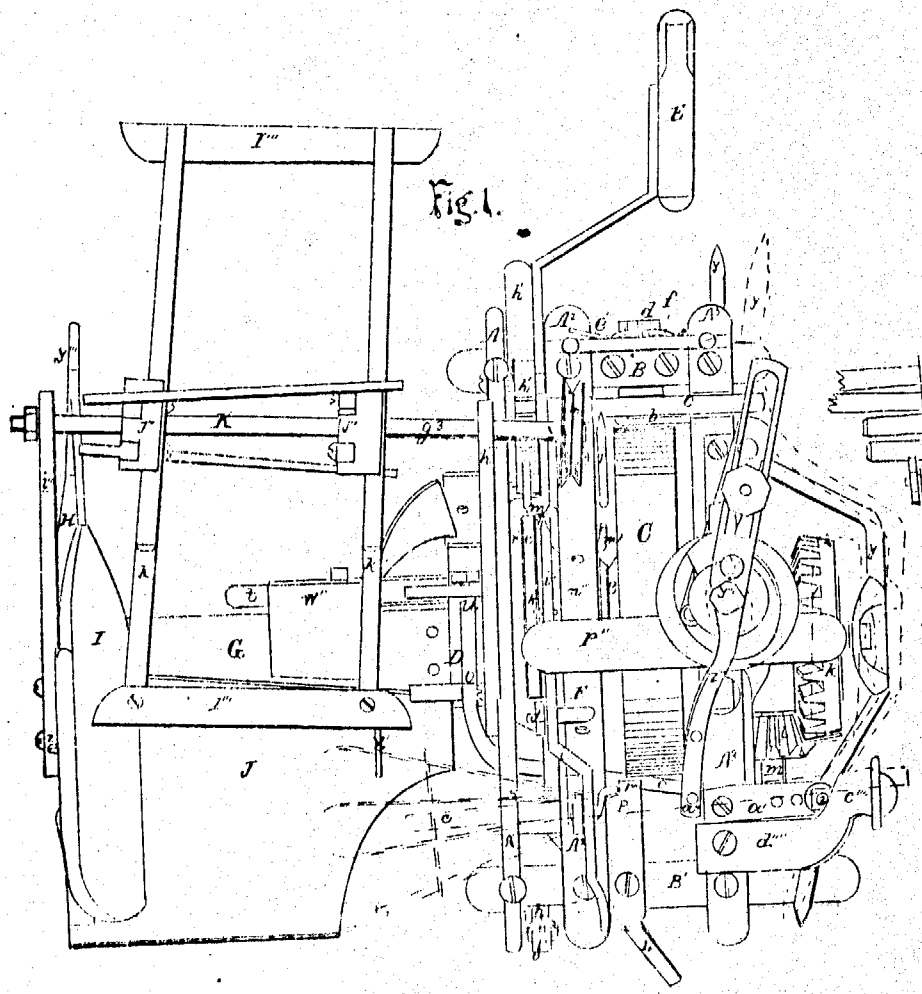
Figure 1 is a plan of this machine.

This lever $y$, near the front end, has one end of the connecting-rod $b^1$ hooked into it, while the other end is hooked into the lower end of the three-armed lever $c^1$, shown in figs. 1, 2, and 4, which lever is under the driver's seat, or within reach of his feet, so that he can operate it with them. This three-armed lever $c^1$ is fast to the rear end of the axle of the ratchet-wheel $d^1$, said axle being confined by a suitable box to the lower side of the beam B.

The front end of the lever $y$ is held as placed by the dogs, or drop-latches $e^1$ and $f^1$. To throw the cutters in motion, when out, the driver raises the dog $f^1$ out of connection with the ratchet-wheel $d^1$, and then bears down upon the inner upper arm of the lever $c^1$, until the gears $k$ and $l$ are properly in connection, the dogs $e^1$ holding the ratchet-wheel $d^1$, as placed, and thereby keeping the gears $k$ and $l$ properly in connection; and, to throw the cutters out of motion, a *vice versa* movement of this lever $c^1$ is made, and it is retained in that position by the dog $f^1$. It will thus be seen that the driver can throw the cutters in or out of motion while the machine is being moved over the ground.

E, as shown in figs. 1, 2, and 4, is the tongue, by which the machine is drawn, and has its connection to the main frame A, made by the horizontal axle bolt $g^1$, so that its vertical angle, relative to the frame A, can be varied, while the machine is in operation. And that the driver may vary the angle of the tongue E to the frame A, upon this axle $g^1$, and while the machine is in motion, there is secured, to its rear end, a segment cog-wheel, $h^1$, the axis of which is the axle-bolt $g^1$; and connected with the cogs thereof are the cogs of a corresponding segment, $i^1$, made fast to the horizontal axle $j$, confined to the lower sides of the beams $A^1$ and $A,^2$ by suitable boxes, one of which is represented at $k^1$, fig. 2, while the lever $l^1$, by which the driver turns this cogged segment $i^1$, as he desires, is rigidly secured to said segment, and projects upward in a position convenient to the driver's foot or hand.

The dog, or drop-latch $m^1$, has its holding-end drop between the cogs of the ratchet-wheel $n^1$, or between those of $i^1$, to retain the tongue E at the desired angle, relative to the main frame A.

The tongue E, by being thus connected to the frame A, contains four peculiar features, or elements:

First, it has a horizontal axis between it and the main frame.

Second, its angle to the frame is variable.

Third, its position to the frame may be retained as placed by the driver.

Fourth, the adjustment of the tongue E, in respect to the frame A, may be made by the driver while the machine is in motion, and thus the points of the fingers and cutters thrown more or less up or down, in respect to the other ends, without stopping the machine, and be held low, as placed by him, so as to take up lodged grass, or be held higher, where the grass is standing, and does not require them to be so low.

$o^1$, $p^1$, $q^1$, and $r^1$ are the vertical plates, and $s^1$ $s^1$, (one of which is not shown,) the screw-bolts, by which one of the parts of the hinge-joint, of which $v$ is the axial bolt, is connected to the frame A, so that the shoe D may have the hereinafter-described movements and adjustments, in respect to this frame.

The shoe D, as shown in fig. 5, is connected to the plate $o^1$, by the axial bolt $v$, and has no other connection with this plate $o^1$, than that derived through the said axial bolt.

This plate $o^1$ has formed in its inner side, a face-gear, $t^1$, and has two curved slots, $u^1$ $u^1$, fig. 4, through it, the centre of whose curve is also the axis of the gear $t^1$, and through its rear end a screw-hole, into which is run a set-screw, by which the vertical box $v^1$ of the caster-wheel $w^1$ is confined to the plate $o^1$, so as to hold the shoe D at the desired height from the ground.

The plate $p^1$, shown in some figures, has projecting from its outer side, a gear, $x^1$, that meshes with gear $t^1$, so that the plate $o^1$ may be vibrated in respect to plate $p^1$, upon the axis of gear $x^1$, and has two holes, $y^1$ $y^1$, through it, corresponding in distance from the axis of the gears $t^1$ and $x^1$, and with the slots $u^1$ $u^1$, and has two vertical tongues, $z^1$ $z^1$, projecting from its inner side.

The plate $q^1$, shown in the same figures, has in its outer face two grooves, in which the tongues $z^1$ $z^1$ of plate $p^1$, fit and slide, two vertical tongues, $a^2$ $a^2$, projecting from its inner side, that fit and slide in corresponding grooves $b^2$ $b^2$ in beam $A^2$, and also a vertical cog-rack, $c^2$, sunk into its inner side, and two rows of holes $d^2$ $d^2$ through it, which agree with the holes $y^1$ $y^1$ in plate $p^1$, and with the curved slots $u^1$ $u^1$ in plate $o^1$, so that the plates $o^1$ and $p^1$, and the shoe D, may be held at the desired height, in respect to this plate $q^1$, by the screw-bolts $s^1$ $s^1$.

The plate $q^1$, as shown in figs. 10, 11, and 3, is held to the beam $A^2$ by the plate $r^1$, secured to this beam by screws, and a drop-plate, $e^2$, of the thickness of plate $p^1$, but free to be slid up and down in respect to $A^2$.

The outer edge of the frame A, to which the shoe D is connected, is carried, when mowing, by the caster-wheel $f^2$, by placing its vertical axle in the adjustable box $g^2$, confined to the rear side of beam $B^1$, by the set-screws, $h^2$, as shown in figs. 1 and 2. And that the shoe D may be held at the desired height, in respect to the frame A, when reaping, the upper end of box $g^2$ is extended some distance above the frame A, and has a ratchet formed in its inner edge, to hold the rear end of lever $i^2$ in and at the desired height.

This lever $i^2$ has its fulcrum-pin $j^2$, secured to the supporting-frame F of the automatic rake $c$, and its front end pivoted to the upper end of plate $q^1$, by the rod $k^2$. But when the machine is used for reaping, the caster-wheel $f^2$ is removed from its box $g^2$, so as not to be in the way of the gavels, as they are removed from the platform by the automatic rake $c$, the caster-wheel $w^1$ then being used instead of the wheel $f^2$, and the plate $o^1$ so adjusted, in respect to this wheel $w^1$, that the outer edge of the frame A, when held in connection with the plate $q^1$, as just described, as well as the shoe D, will be carried by this wheel $w^1$, and at the desired height.

Another way of making the connection between the plate $q^1$ and lever $i^2$ is, by having the cogs of pinion $l^2$ on shaft $m^2$, engage with the cogs of the vertical rack $c^2$ in plate $q^1$, while the front end of this shaft $m^2$ is sustained in a suitable box, secured to the lower side of the beam $A^2$; and the rear end is sustained in box $n^2$, secured to the beams $A^1$ and $A^2$, and has on it, near the rear end, the pinion $o^2$, the cogs of which engage with the cogs of the vertical rack $p^2$, whose upper end is pivoted, at $q^2$, to lever $i^2$, and has the cogged portion held in its proper place, by the guide-block $r^2$, confined to beam $B^1$.

It will appear, that the connecting-rod $k^2$, in combination with the lever $i^2$, and the rack-and-pinion arrangement just described, in combination therewith, operate conjointly to accomplish the same result, that of raising and lowering the shoe D, in respect to the frame A, and that either of these, in combination with the lever $i^2$, would be competent to its accomplishment.

From the foregoing, it will be seen that the main frame A has two supporting-wheels, while mowing, which are independent of the shoe D, so that—

First, said shoe is left free to rise and fall with the undulations of the ground, &c., independent of the rising and falling of the inner and outer edges of this frame A.

Second, that the attendant can have a part only, or all the weight of the shoe D, while mowing, carried by the wheel $w^1$, and at the desired height.

Third, that the weight of the shoe D, as well as that of the outer edge of the frame A, will be carried by this wheel $w^1$, when reaping.

Fourth, that the attendant can raise and lower the cutting-apparatus, of which this shoe D forms a part, over a small obstruction while mowing, by means of the frame A being sustained upon the wheels C and $f^2$, the shoe D being connected to the frame A, by the lever $i^2$ and connecting-rod $k^2$, and the outer end of the finger-bar G, secured to shoe D, being limited in its downward vibrations by the inner edge of the shoe coming against the outer edge of the plate $p^1$; and Fifth, that the attendant can have the shoe D held at various heights from the ground, and at the desired fixed distance below the frame A when reaping.

The shoe D, by having on it the guide-way and horizontal slot $s^2$, to guide the inner end or heel of the cutter-bar $t$ across it, in a straight line, and for the cutters $a$ $a$ to pass through, and the finger-bar G connected thereto, by screws, as shown in figs. 1 and 4, and having its connection with the plate $o^1$, made by the axial bolt $v$, without any other connection therewith, while this plate $o^1$ is connected to the main frame A, as above described, contains eight peculiar features or elements:

First, a guide-way, which guides the cutter-bar $t$ across it in a straight line.

Second, there is a portion above as well as below that part of the cutter which is in front of the connection of the pitman $o$ with the cutter-bar.

Third, the removal of the axial bolt $v$ leaves it entirely disconnected from the main frame A.

Fourth, its capacity to have the horizontality of its axial bolt $v$, in respect to that of the main frame A, varied.

Fifth, the finger-bar G can be attached to or removed from this shoe D, at pleasure, by the attendant.

Sixth, the finger-bar G has no other connection with the frame A than that derived through this shoe D.

Seventh, it holds the cutter-bar $t$ down at its heel by a holder, which is further back than the front of this bar, where the pitman passes through it.

Eighth, it has the slot for the cutter higher than the guide-way for the cutter-bar.

The combination, in the harvester-shoe, of the three first of these eight features or elements is the most essential, as this is regarded by many manufacturers and users as indispensable in a first-class cutting-apparatus for mowing.

But we do not wish to be understood as claiming that JESSE URMY was the first to conceive the idea of making this combination, as we are aware that William Gage made it before he did; but we are not aware that any person, prior to the invention of said JESSE URMY, ever put in combination in the harvester-shoe the first, second, third, sixth, and eighth of these elements.

Wherever the shoe D is named in any one of the following claims, no other than the first, second, third, and sixth, of said eight elements, are to be understood as included in it, unless distinctly stated that more are, and what one or ones.

The finger-bar G, by being made narrower at the outer end than at the inner, as shown at fig. 1, requires less material for its construction, and less power applied by the driver to raise it over an obstruction, while the machine is in operation, than if it were as wide at the outer end as at the inner.

The fingers $g$ $g$, as shown, are of two kinds:

One is that termed the closed finger, for the reason that both the portion above as well as below the cutter is secured, in rear of it, to the finger-bar.

The other is that termed the open finger, for the reason that the portion above the cutter has no other connection with the finger-bar than that received through that portion in front of and below the cutter, thereby leaving the rear of the slot, through which the cutter is reciprocated, open for the escape of clogging matter, and thus doing away with the necessity of the groove $v^2$, for the clearing projections $u^2$, above the cutter $a$, as is shown in the closed finger.

Both fingers have a portion below the finger-bar that forms slides for it, and both must have, below the cutter, the same-sized groove, $v^2$, for the clearing projections $u^2$, as these clearing projections change from one to the other at each reciprocation of the cutter.

The upper portion of both the open and closed finger is embedded in the lower portion, and secured thereto by a single screw, and therefore can be removed at pleasure by the attendant.

The closed finger, above as well as below the cutter, is concave, so that it will only touch the edges; and below the cutter, as shown in fig. 21, is a concave bed-plate, $t^2$, of steel, and secured to the lower portion by two screws, so that the attendant can take it out for grinding, the upper portion of the finger being confined to the lower portion and finger-bar by screws that this may be done.

The cutters $a$ $a$ are of two kinds, the one in the closed finger being concave on the lower side, while that in the open finger is flat.

The cutter in the closed finger, and the clearing projections $u^2$, are secured to the cutter-bar by rivets, while the cutter in the open finger is secured to the cutter-bar by screw-bolts, the heads below and the nuts above the cutter forming clearing projections the same as the short strips above and below the central portion of the other cutter do In order that the clearing projections shall carry out at each reciprocation all drawn into the slot of the finger by the preceding reciprocation of the cutters, and the forward movement of the machine, these strips only occupy about one-half the width of the cutter on the cutter-bar, so that the ends, in advance, can take hold of the clogging matter and force it out.

The cutter, by being secured to the cutter-bar by screws, as described, can be readily removed for grinding, &c.

By having these two kinds of fingers and cutters in the same cutting-apparatus, the fact may be ascertained which is the best kind of finger, and which the best kind of cutter; but to our judgment, all things considered, the open finger and flat cutter are the most practical.

Neither of these, however, nor their combination, is claimed as the invention of said URMY, as we are aware that this was done prior to his invention. But we are not aware that a cutting-apparatus for harvesters ever existed prior to his invention, having at the inner end the shoe D, or an equivalent thereof, containing either the three first, or the first, second, and sixth elements herein explained; at the outer end a divider of a less width, where cut against, than the length of a section of the cutter on the cutter-bar; fingers between this shoe and divider, with a portion above as well as below the cutter, and one of these portions having no other connection with the finger-bar than that received through that portion in front of and at the other side of the cutter; and a cutter, the sections of which are rigidly secured to the cutter-bar.

Neither are we aware that a finger was ever used between this shoe and divider which had in it, next the edge of the cutter, steel or other metal, harder than the main part; or a plate that could be taken out by the attendant and ground.

Neither are we aware that the cutter used with this shoe and divider had any kind of clearing-device, whether the fingers were open or closed ones.

Neither are we aware that a reel of any kind for pressing the uncut crop to the cutters of this cutting-apparatus was ever used, or an automatic mechanism of any kind which removed the cut crop in gavels, or at intervals from this cutting-apparatus.

To the upper side of the cutter-bar $t$ is confined the plate $w^2$, which rests and slides on the finger-bar, to free it from gum and dirt, and aid the cut crop to pass freely from it.

Near the inner end or heel of the finger-bar G, and projecting above it, is a broad curved plate, $x^2$, set edge upward, as shown in fig. 1, for guiding the uncut crop properly to the cutters and on to the platform J, or to the ground, instead of allowing it to fall over on to the frame A, as it would do but for this plate $x^2$.

H is the main part of the divider, of a less width, where cut against, than the width of a section of the cutter on the cutter-bar, and therefore termed a narrow divider, and is confined to the outer end of the finger-bar G by a screw-bolt, and has confined to the lower edge the bent bar or rod $y^2$, shown in fig. 9, the rear end of which forms the axis upon which the front end of the guiding-board I is supported, while the rear portion of this board is supported by the bars $z^2$ and $a^3$, secured to its under or outer side, and hinged at their outer ends to the bars $b^3$ $b^3$, secured to the outer side of H.

And that this board I may be turned more or less from a vertical towards a horizontal position, so as to guide the falling grain, after cut, more or less toward the inner side of the platform J, the outer end of $z^2$ has formed on it a circular ratchet, and has, in connection therewith, the upper and hooked end of a holding-dog or latch, $c^3$, the lower end of which is secured to H.

The board I can, therefore, be held at the desired position by placing the upper end of the dog or latch $c^3$ into the proper notch of the ratchet in $z^2$.

$e^3$ is the caster-wheel, by which the divider H, together with the outer end of the cutting-apparatus and outer end of the reel is carried.

This wheel is made self-adjusting, that the machine may be more readily turned in at the corners than if a wheel in its place, having a fixed axle, were used; and that the outer end of the cutting-apparatus may be carried at the desired height thereby, the upper end of the box, in which this wheel's vertical axle revolves, has a long slot made in it, and a vertical groove cut in the inner side of the divider H, and is confined in this groove by a set-screw, $f^3$, shown in fig. 3, and fast to the divider, when it is raised to the desired height to hold it there.

The platform J, on which the cut grain falls from the cutters, when the machine is used for reaping, and on which it lies, until removed by a rake that slides it thereon and therefrom at intervals, has its inner end confined to the finger-bar G, by a single screw, that passes through the front end of a batten, confined to the lower side of the platform, about at right angles to the finger-bar, while the outer end is confined to the divider by two screws only.

The platform J, by being thus connected to the finger-bar and divider, will slide as freely over the ground as the finger-bar, and can be very quickly removed for mowing.

Through this platform is made a hole, for the vertical box of the caster-wheel $e^3$.

K, marked on its shaft $g^3$, is the reel by which the standing crop is pressed backward to the cutting-apparatus.

The inner support $h^3$, of this shaft $g^3$, is secured to the beam $A^1$, while the support of the outer end $i^3$ is secured to the divider H, and the shaft $g^3$ connected to its support $i^3$ in such a manner as to maintain, substantially, the same relative position, in respect to the divider and finger-bar, while vibrated upon the axial bolt $v$, while it and the cutter's driving-wheel remain in the same position, by reason of the shaft $g^3$ sliding in its inner support $h^3$.

$j^3$ $j^3$ are two hubs, keyed fast to the shaft $g^3$, that have in both the inner and outer side of each two grooves, those in the one side about at right angles to those in the other side, in which the arms $k^3$ $k^3$ $k^3$ $k^3$ are confined by screws, that they may readily be adjusted, so as to make the diameter of the reel larger or smaller, there being a provision made in the arms $k^3$, &c., for this being done.

To the outer ends of the arms $k^3$ are confined the fans, or gatherers $l^3$, by which the crop is pressed back to the cutting-apparatus.

This reel K is driven by a band, that receives the rotary motion of the pulley $e$, and imparts it to pulley $m^3$, fast on shaft $g^3$, and contains two peculiar features, or elements:

First, it always moves substantially with the vibration of the shoe D, upon its axial bolt $v$, and, therefore, does not injuriously change its position, in respect to the divider H, as would be the case were it controlled by its inner support $h^3$, instead of by its outer support $i^3$.

Second, the attendant can change the diameter of this reel, and, therefore, can change the velocity of its blades when he desires.

The supporting-frame F of the automatic rake $c$, as shown in figs. 2 and 4, is formed of the two iron brackets, $n^3$ and $o^3$, secured to the beams $A^2$ and $A^3$, and the beam $p^3$ and cast-piece $q^3$, secured to the upper sides of $n^3$ and $o^3$, and between which the vertical shaft $r^3$ is sustained, while its lower end is held in place by the step-box $s^3$ confined to the upper side of beam $A^3$.

This vertical shaft $r^3$ has on it, near its lower end, the cog-wheel $t^3$, the cogs of which can, by the attendant, be made to mesh or gear with either row of the cogs, $u^3$, on the inner face of the driving-wheel C, so as to cause the rake $c$ to remove a gavel more or less frequently, as the thickness of the grain requires, and also can be held out of connection with either for stopping the movement of the rake, while moving the machine from place to place, by properly placing this cog-wheel $t^3$, and tightening the key-wedge, by which it is held to its shaft $r^3$.

$v^3$ is a cam on the shaft $r^3$, just above the beam $p^3$, in which is carried a traveller, on the downward-projecting arm of the arm $w^3$, whose fulcrum is the post $x^3$, supported by the front end of the cast-piece $q^1$.

Then, to the upper end of the shaft $r^3$, is attached a crank-wrist, $y^3$, which is made adjustable toward and from it, to give the rear end of the arm $z^3$, to which the rake $c$ is pivoted at $a^4$, as shown in fig. 1, a greater or less distance of movement, and which arm has in it two holes for this wrist $y^3$, and two holes in its rear end, for the pivot $a^4$.

This arm $z^3$ has in its front end a long slot, in which is a loose collar on and near the upper end of post $b^4$, supported in the front end of arm $w^3$, and which has two holes for this post, so as to give the front end of arm $z^3$ a greater or less inward and outward vibration, as may be required for the rake $c$, which moves outward, while this end of the arm $z^3$ moves inward.

By these arrangements for adjusting the distance, the rake $c$ will move inward and outward, to suit the width of the platform.

The rake $c$ can be carried a greater or less distance backward, after removing the gavel, so as to pass out in rear of the cut grain, on the platform, when of different lengths, without coming in contact with it, and thereby be enabled to remove it in the best condition from the platform by sliding it thereon and therefrom, so as to be out of the road of the machine while cutting the next round, as the inner end is held in its proper place, at a point further from the outer end than its axis of motion, by the parts forming the slot $c^4$, in the upper end of $d^1$, secured to beam $A^3$; and that the gavels may reach the ground in the most compact and regular form, and be prevented from going against the driving-wheel C, the hinged guard-board L is secured to the lower side of the beam $B^1$, so as to prevent the inner side of the gavels from being thrown too far by the rake, and away from the other portions of them.

This automatic rake $c$, by being thus constructed and combined with its driving-wheel C, contains seven peculiar features, or elements:

First, it has between it and its driving-wheel, a vertical gear-shaft, through which the motion of the driving-wheel is imparted.

Second, it has meshing into the cogs of its driving-wheel, the cogs of the gear-wheel on said vertical shaft.

Third, it has between it and its driving-wheel such a combination of parts that the attendant is enabled to change the frequency of its removal of the gavels.

Fourth, it has between it and its driving-wheel such a combination of parts that the attendant is enabled to stop its movement while the machine is being moved from place to place.

Fifth, it has, between it and its driving-wheel, such a combination of parts that it has given to it a more rapid movement in one part of its circuit than in another part thereof.

Sixth, the axis upon which it is moved over the platform horizontally is about vertical.

Seventh, its course of movement to come in contact with the cut grain on the platform at intervals, is governed by a part further from the outer end than its axis, or point of support, by which it is moved over the platform.

It is well known that automatic rakes for harvesters, which slide the cut grain on the platform, thereon and therefrom in gavels, had been used previous to the aforesaid invention, but it is not believed that any such rake was ever used in combination with a platform, which had between it and the main frame of the machine an axis of motion about parallel with its line of forward movement, upon which this platform would be vibrated, in respect to said frame, while the machine was in motion; and, also, in combination with the shoe D, or an equivalent thereof, having features, or elements one and two therein, and the open fingers herein described, as a part of the cutting-apparatus in front of this platform; and therefore,

What is claimed in this patent as the invention of said JESSE URMY, is—

1. The combination of the automatic rake $c$, which removes the cut grain from the platform at intervals, or in gavels, by sliding it thereon and therefrom, the platform J having in front of it the open fingers $g$, and between it and the main frame an axis about parallel with its line of forward movement, or equivalents of these parts.

2. The combination of the automatic rake $c$, having between it and its driving-wheel the vertical gear-shaft $r^3$, through which this wheel's motion is received, and removing the cut grain from the platform at intervals, or in gavels, by sliding it thereon and therefrom, the platform J having in front of it the open fingers $g$, and between it and the main frame an axis about parallel with its line of forward movement, or equivalents of these parts.

3. The combination of the automatic rake $c$, having between it and its driving-wheel the adjustable gear-wheel $t^3$, by which the attendant is enabled to stop the motion of this rake, which slides the gavels on and from the platform, while the machine is being moved from place to place, the platform J having in front of it the open fingers $g$, and between it and the main frame an axis about parallel with its line of forward movement, or equivalents of these parts.

4. The combination of the automatic rake $c$, having between it and its driving-wheels, bearing upon the ground the different-sized gears $w^3$ $w^3$, and the adjustable gear-wheel $t^3$, by which the attendant is enabled to change the frequency of this rake's removal of the gavels, by sliding them on and from the platform, and the platform J, having an axis between it and the main frame about parallel with its line of forward movement, or equivalents of these parts.

5. The automatic rake $c$, having between it and its driving-wheel, the cam $v^3$ and the holder $d^1$, or their equivalents, by which this rake, which slides the gavels on and from the platform, is caused to move more rapidly in one part of its circuit than while in another part, in combination with the platform J, having in front of it the open fingers $g$, and between it and the main frame an axis about parallel with its line of forward movement, or equivalents of these parts.

6. The combination of the shoe D, having the guide-way and horizontal slot $s^2$, the platform J, having an axis between it and the main frame about parallel with its line of forward movement, and the automatic rake $c$, which slides the gavels on and from the platform, or equivalents of these parts.

7. The combination of the shoe D, having the guide-way and horizontal slot $s^2$, and the axial bolt $v$, or their equivalents, with the automatic rake $c$, which removes the gavels from the platform, by sliding thereon and therefrom at intervals.

8. The combination of the shoe D, having the guide-way and horizontal slot $s^2$ and axle-bolt $v$, the finger-bar G having in front of it the open fingers $g$, and at the outer end the narrow divider H and the automatic rake $c$, which slides the cut grain on and from the platform at intervals, or in gavels, or equivalents of these parts.

9. The automatic rake $c$, or its equivalent, having its return course for engaging with the gavels, which it slides on the platform and therefrom at intervals, or in gavels, governed by the holder $d^1$, or an equivalent thereof, which is further inward than its axial connection with its driving-mechanism, and fast to the main frame.

10. Making the connection of the platform J, or an equivalent thereof, to the finger-bar of the harvester, the inner end directly to the finger-bar, by a batten that is about at right angles thereto, and the outer end to the divider, secured to the outer end by screw-bolts, substantially as described, so that the platform may freely slide over the ground, and be quickly removed.

11. The combination of the shoe D, having the guide-way and horizontal slot $s^2$ and the axial bolt $v$, and the automatic rake $c$, having between it and its driving-wheel the vertical gear-shaft $r^3$, or its equivalent, and removing the gavels from the platform, by sliding them thereon and therefrom at intervals, or equivalents of these parts.

12. The combination of the shoe D, having the guide-way and horizontal slot $s^2$, and the axial bolt $v$, and the automatic rake $c$, having between it and its driving-wheel the adjustable wheel $t^3$, by which the attendant is enabled to stop the motion of the rake while the machine is being moved from place to place, or equivalents of these parts.

13. The combination of the shoe D, having the guide-way and horizontal slot $s^2$, and the axial bolt $v$, and the automatic rake $c$, having between it and its driving-wheels, bearing upon the ground, the different-sized gears $u^3$ $w^3$, and the adjustable gear-wheel $t^3$, by which the attendant is enabled to change the frequency of the rake's sliding the gavels on and from the platform, or equivalents of these parts.

14. The combination of the shoe D, having the guide-way and horizontal slot $s^2$, and the axial bolt $v$, and the automatic rake $c$, having between it and its driving-wheel the cam $v^3$, and the holder $d^1$, by which it is caused to move more rapidly in one part of its circuit than while in another part, or equivalents of these parts.

15. The combination of the platform J, having between it and the main frame an axis, about parallel with its line of forward movement, the reel K, which presses the standing grain back to the cutters, and the automatic rake $c$, which slides the cut grain on and from the platform at intervals or in gavels, or equivalents of these parts.

16. The combination of the platform J, having between it and the main frame an axis, about parallel with its line of forward movement, the reel K, which maintains substantially the same relative position to the finger-bar and divider, connected with this platform, while vibrated upon the axis, between it and the frame, and the automatic rake $c$, which slides the cut grain on and from the platform at intervals or in gavels, or equivalents of these parts.

17. The combination of the shoe D, having the guide-way and horizontal slot $s^2$, and the axial bolt $v$, the finger-bar G, having in front of it the open fingers $g$, the reel K, which presses the standing crop back to the cutters, and the automatic rake $c$, which slides the gavels on and from the platform at intervals, or equivalents of these parts.

18. The combination of the shoe D, having the guide-way and horizontal slot $s^2$, and the axial bolt $v$, the reel K, which maintains substantially the same relative position to the finger-bar and divider, connected to this shoe, while vibrated upon the axis $v$, and the automatic rake $c$, which slides the gavels on and from the platform at intervals or in gavels, or equivalents of these parts.

19. The combination of the platform J, having between it and the main frame an axis, about parallel with its line of forward movement, the automatic rake $c$, which slides the gavels on and from the platform at intervals, and the horizontal axis $g^1$, on which the relative heights of the front and rear edges of the platform can be varied, or equivalents of these parts.

20. The combination of the platform J, having between it and the main frame an axis, about parallel with its line of forward movement, the automatic rake $c$, which slides the gavels on and from the platform at intervals, and the horizontal axis $g^1$, the cogged segment $h^1$, the cogged segment $i^1$, its axle $j^1$, and its holding-dog or drop-latch $m^1$, by which the attendant is enabled to have the front edge of this platform held higher or lower in respect to the height of the rear edge, or equivalents of these parts.

21. The combination of the platform J, having between it and the main frame an axis, about parallel with its line of forward motion, the automatic rake $c$, which slides the gavels on and from the platform at intervals, and the horizontal axis $j^1$, the lever $l^1$, and its holding dog or drop-latch $m^1$, by which the attendant is enabled to change the relative heights of the front and rear edges of this platform, on and from which the rake slides the gavels at intervals while the machine is in operation, and also have these edges held as placed.

22. The combination of the platform J, the automatic rake $c$, and the guard-board L, or their equivalents, with the main frame of the harvester, said platform having between it and the frame an axis, about parallel with its line of forward movement, said rake sliding the gavels on and from the platform at intervals, and said guard-board holding the gavels, as described.

In testimony whereof, we have hereunto set our hands, this 22d day of May, 1867.

DANIEL URMY.
JOHN MANZ.

Witnesses:
LEWIS F. ADAN,
THOMAS YOUNG.